Feb. 6, 1934.                H. O. PRESTON ET AL                1,946,428
                              FLUXING APPARATUS
                             Filed Oct. 7, 1930          3 Sheets-Sheet 3

Inventors
Harrison O. Preston
Frederick J. Strowbridge
By their Attorney
R. J. Dearborn Patented Feb. 6, 1934

1,946,428

UNITED STATES PATENT OFFICE 1,946,428

FLUXING APPARATUS

Harrison O. Preston and Frederick J. Strowbridge, Port Arthur, Tex., assignors to The Texas Company, New York, N. Y., a corporation of Delaware Application October 7, 1930. Serial No. 486,881

11 Claims. (Cl. 113—95)

This invention relates to fluxing machines and particularly to machines for applying solder flux to the seams of cans which are to be soldered.

In the making of liquid containers such, for example, as tin cans, it is the usual practice to separately form the can body and the two ends. These elements are then assembled in their proper position with respect to each other and the adjacent edges are soldered, crimped, rolled, or otherwise secured together to effect a liquid-tight seal. When a soldered seam is desired the soldering operation involves as a preliminary step the application of a suitable flux to the seams. The fluxing operation, if done according to common practice, consumes the time and labor of one or more operators who can be dispensed with if the flux is applied by an automatic apparatus.

The present invention contemplates the provision of a fluxing machine which is not only efficient but entirely automatic in its operation, and it is an object of the invention to provide means for feeding cans or containers to the machine at predetermined spaced intervals. Another object of the invention is to provide means for applying solder flux to the end seams of each container or can body simultaneously and in a single operation. A still further object of the invention is to provide means for maintaining the flux applying elements in a constantly saturated condition so as to insure a proper application of the flux to the seams of each container. Other objects, features and advantages of the invention will be more fully pointed out and described in the following detailed description of the apparatus.

In describing the machine or apparatus reference will be made to the accompanying drawings which illustrate a preferred embodiment of the invention and in which:

Fig. 4 is an enlarged detail view taken on line 4—4 of Fig. 3.

Figure 1:
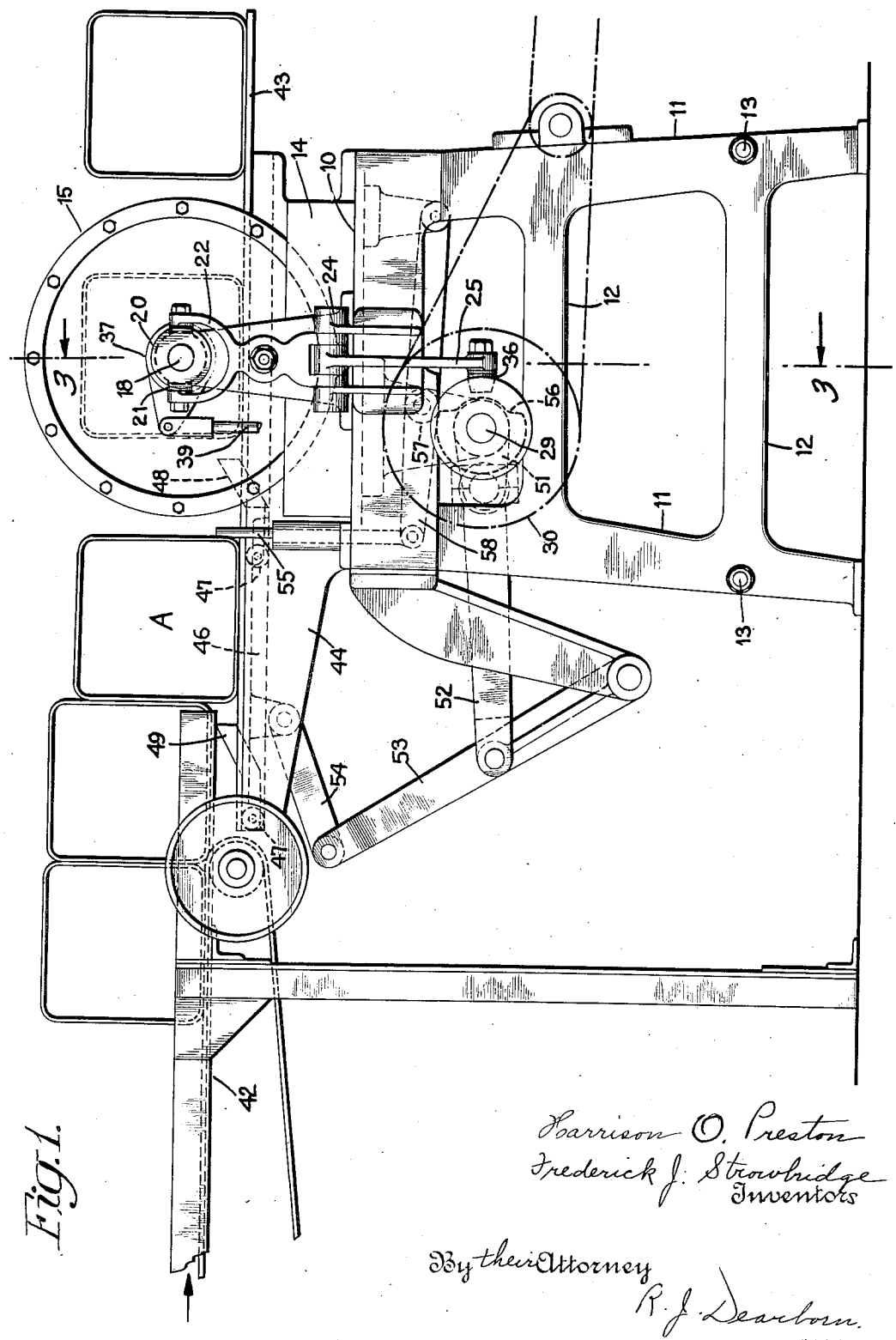
Fig. 1 is a view in side elevation of a fluxing apparatus embodying the present invention.

Referring to the drawings, it will be seen that the apparatus includes a table or platform 10 mounted on legs or supports 11 which are braced by cross bars 12 and tie-rods 13.

Figure 3:
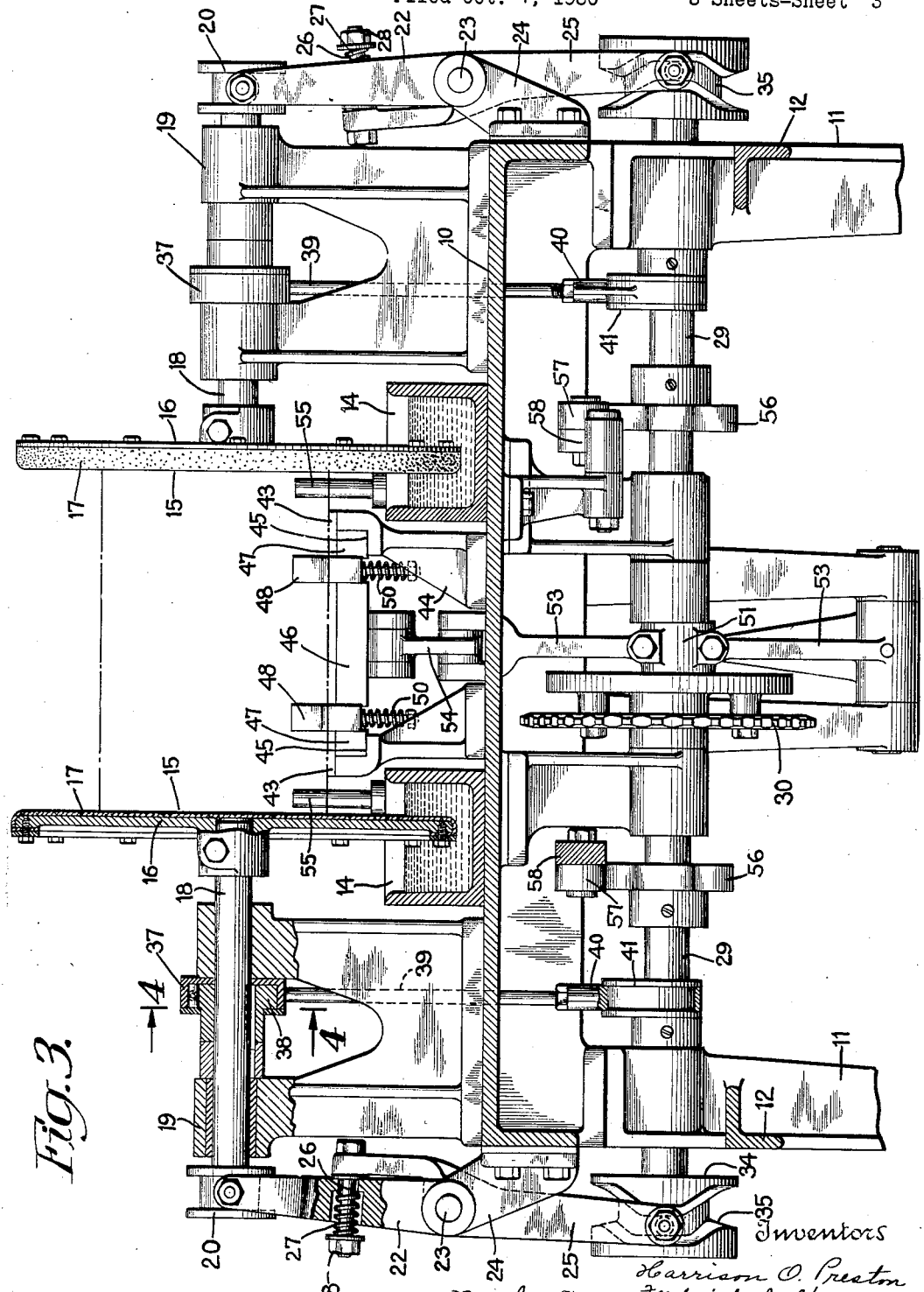
Fig. 3 is an enlarged sectional view of the apparatus taken on the line 3—3 of Fig. 1.

Table 10 supports a pair of spaced open-top reservoirs 14, each adapted to contain solder flux as clearly indicated in Fig. 3. A pair of spaced flux applying discs 15 are vertically mounted in parallel planes in such a manner that the lower portions of each of the discs pass through the flux contained in one of the reservoirs 14.

The discs 15 are each formed with a ring or plate 16 to which a felt pad 17, or a pad of some other suitable material, is secured so that as the lower portions of the discs pass through the flux in the reservoirs 14 the pads will be kept in constantly saturated condition.

Figure 2:
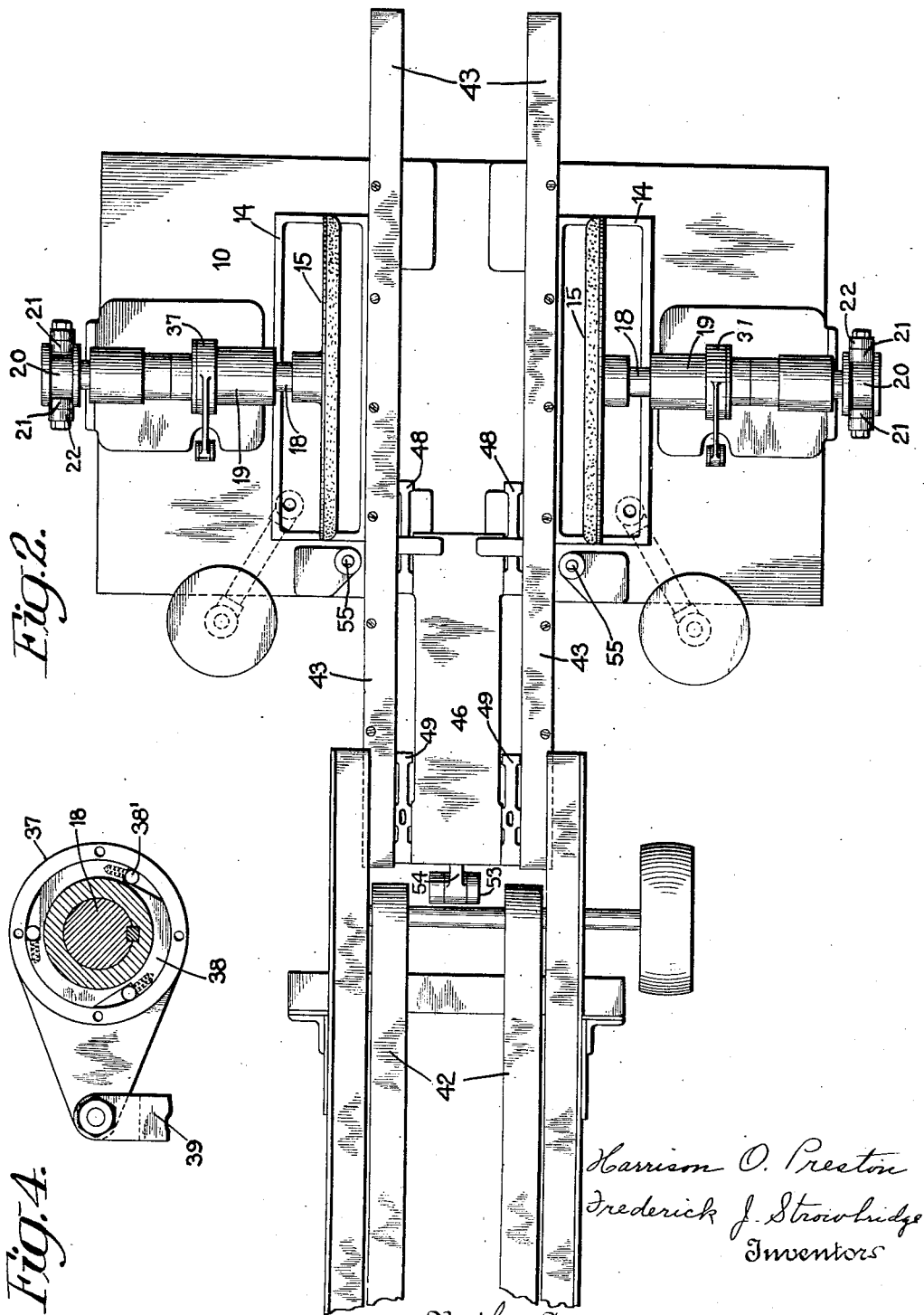
Fig. 2 is a plan view of the same apparatus.

The discs 15 are mounted upon the ends of rotatable and longitudinally movable shafts 18 which are mounted in suitable bearing brackets 19 mounted upon the table 10. Each shaft has secured on its outer end a grooved clutch collar 20 and the groove of each collar is adapted to accommodate a pair of oppositely disposed clutch rollers 21 which are mounted upon the bifurcated ends of cam levers 22, as shown in Fig. 2.

The lower ends of the two cam levers 22 are pivotally mounted on pins or rods 23 supported in brackets 24 mounted on opposite sides of the supporting table 10. Also mounted on the same pins 23 are cam levers 25, the points of supports being intermediate the ends of these levers. The upper end of each of the levers 25 is disposed parallel and closely adjacent to the lower end of one of the levers 22 and a bolt 26 extends through suitable openings in each pair of levers. One end of each of the bolts is provided with a spring 27 and an adjusting nut 28 so that any desired compression can be placed upon the springs to equalize the pressure exerted on the shafts 18 during the operation of the levers as will presently be described. It will be seen that each pair of levers 22 and 25 will operate as a single lever having a degree of flexibility by reason of the use of the compression spring 27.

A main operating shaft 29 is mounted beneath the table 10 in bearings formed in brackets which are secured to the supporting structure. A sprocket wheel 30 is mounted upon shaft 29 and a chain 31, illustrated diagrammatically in Fig. 1, is carried by this sprocket wheel as well as by a smaller sprocket wheel 32 mounted upon a shaft 33. Power from any suitable source is applied to operate shaft 33 and the rotation thereof in any manner imparts a similar movement to the main operating shaft 29.

At each end of the main operating shaft 29 there is secured a sliding cam 34. Each cam is formed with a peripheral camway 35 adapted to accommodate a sliding roller 36 mounted on the lower end of each of the levers 25. The camways 35 are so designed that they will give a reciprocating motion to each pair of cooperating levers 22 and 25. The movement of the pairs of levers is simultaneous and in opposite directions and for this reason the shafts 18 are moved simultaneously and longitudinally toward and away from each other with a corresponding movement of the discs 15.

Provision is made for rotating the discs 15 through the flux in the reservoirs 14 in order to keep the pads 17 constantly saturated with the flux. A ratchet shell 37 disposed upon each of the shafts 18 houses a core 38 and rollers 38'. Ratchet rods 39 are pivotally connected at their upper ends to projections on each of the shells 37, and on the lower end of each rod 39 there is secured a cam follower 40 which rides on the surface of a cam 41. The cams 41 are mounted on shaft 29 and are designed to periodically raise and lower the rods 39 to actuate the ratchets and rotate the shafts 18 and discs 15.

A belt conveyor 42 is provided for delivering cans to the fluxing machine. The cans, as they are discharged from the end of the conveyor, are delivered to a support or track formed of spaced parallel plates 43 which extend between the discs 15. The plates 43 are secured to the upper ends of spaced cross head guides 44 which are supported on the table 10 and which are also formed with guides or tracks 45 extending beneath and parallel to the plates 43.

A cross head or carriage 46 having rollers 47 is mounted upon the guides or tracks 45 and is adapted to be moved forward and backward on the guides in order to deliver cans to the flux applying discs 15, and to discharge the cans from between the discs after the flux has been applied. For this purpose the cross head 46 is provided at its forward end with a pair of spaced upwardly projecting spring actuated dogs 48 and at its rear end with a second pair of upwardly projecting spaced dogs 49.

When the cross head is in the position shown in Fig. 1 the can A is supported upon the plates 43 directly above the cross head 46 and between the front and rear dogs 48 and 49, respectively. When the cross head 46 is moved forward, or to the right as viewed in Fig. 1, the rear dogs 49 engage the can and push it into position between the discs 15. The cross head 46 is then withdrawn and returned to its original position, ready to receive another can from the conveyor. As the cross head is withdrawn from beneath the can A the dogs at the forward end are depressed against the action of springs 50 which hold them normally in an upwardly extending direction. On the next forward movement of the cross head 46 the forward dogs 48 engage the side of the can A and push it from its position between the discs while at the same time the dogs 49 at the rear of the cross head engage another can and push it into the space from which the preceding can is being removed.

The reciprocating movement of the cross head 46 is synchronized with the movement of the flux applying discs 15. For this purpose a crank 51 is keyed upon the main shaft and its extending end is pivotally connected to one end of a connecting rod 52 which is in turn connected through levers or links 53 and 54 with the cross head. Through this series of levers and links the rotary movement of the shaft 29 is transformed into a reciprocating motion of the cross head 46.

In order that cans may be delivered from the conveyor 42 to the plates 43 at the proper moments in the cycle of operation, stops 55 are provided. The movement of the stops 55 is regulated by cams 56 which are mounted upon the main shaft 29. Rollers 57 mounted on levers 58 ride on the cam surfaces and raise and lower the levers 58 in accordance with the position and configuration of the cams. One end of each of the levers 58 is pivotally connected to the lower end of one of the stops 55 so that the stops move up or down in accordance with the movement of the levers as actuated by the cams.

The operation of the apparatus is as follows:

Cans are delivered in continuous succession on the conveyor 42 and their forward movement is periodically arrested by the action of the stops 55. At this point one can has been pushed from the conveyor onto the plates 43 and is disposed above the cross head 46 and between the dogs 48 and 49 which are positioned at opposite ends of the cross head. The cross head is next moved forward by the action of the crank 51 through the connecting rod 52 and links 53 and 54. When the can has reached a position directly between the two discs 15 the forward movement of the cross head ceases.

At this point in the cycle of operation the shafts 18 move longitudinally toward one another by reason of the movement of the cams 34 which is imparted to the shafts 18 through levers 22 and 25 and clutch collar 20. The movement of the shafts 18 produces a corresponding movement of the discs 15 until they engage the ends of the particular can which may at that moment be positioned between them. The pressure exerted against the ends of the cans by the discs 15 may be regulated and controlled by adjusting the nuts 28 on bolts 27 and the pressure need only be sufficient to assure an adequate application of the flux to the seams of the cans. The cans are only momentarily held between the discs before the cams 34 operate to reverse the movement of the shafts 18 and before the cross head 46 advances to expel the can then between the discs and to introduce the next succeeding can of the series. This operation may continue as long as cans are fed to the machine.

Obviously many modifications and variations of the invention, as hereinbefore set forth, may be made without departing from the spirit and scope thereof, and therefore only such limitations should be imposed as are indicated in the appended claims.

We claim:

1. In combination with a main conveyor, spaced flux applying means, a track extending between said applying means and under one end of said conveyor whereby can bodies are fed from said conveyor to said track, means for moving successive can bodies along said track between the flux applying means, means for actuating the flux applying means into gripping engagement with each successive can body, and means for withdrawing the can moving means while the can bodies are engaged by the flux applying means.

2. In a fluxing machine, a pair of oppositely disposed movable shafts, a pad adapted to be saturated with solder flux mounted upon the adjacent ends of each of said shafts, means for moving said shafts longitudinally at regular intervals for engaging the opposite ends of a can to transfer solder flux from the pads to the end seams of the can, and means for delivering cans in timely succession into the spaces between the pads.

3. In a fluxing machine, a pair of spaced pads adapted to be saturated with a solder flux for application to the end seams of a can, means for actuating the solder pads towards each other to engage the ends of the can and for controlling the duration of the period of engagement, and means operated in synchronism with said pad actuating means for delivering cans in timely succession into the space between the pads.

4. A fluxing machine comprising spaced vertically disposed pads adapted to be saturated with a flux and to engage a can body between them, means for periodically actuating a can body into the space between the vertically disposed pads, and means for intermittently compressing said pads against the end seams of the can body in order to transfer some of the flux from the pads to the end seams of the can.

5. A fluxing machine comprising spaced vertically disposed pads adapted to be saturated with a flux and to engage a can body between them, means for periodically actuating a can body into the space between the vertically disposed pads, means for compressing said pads against the end of the can body in order to transfer some of the flux from the pads to the can seams, and means for regulating the pressure on said pads.

6. A fluxing machine comprising spaced vertically disposed pads adapted to be saturated with a fluxing material, means for periodically moving a can body into the space between the pads, and means for intermittently actuating said pads horizontally to engage the opposite ends of the can body between them to transfer some of the flux from the pads to the end seams of the can.

7. A fluxing machine comprising spaced pads adapted to be saturated with a flux and to engage a can body between them, means for periodically actuating a can body into the space between the pads, and means for intermittently compressing said pads against the end seams of the can body in order to transfer some of the flux to the seams.

8. A fluxing machine comprising spaced pads adapted to be saturated with a flux and to engage a can body between them, means for periodically actuating a can body into the space between the pads, and cam-controlled means for intermittently compressing said pads against the end seams of the can body to transfer some of the flux to the said seams.

9. A fluxing machine comprising spaced pads adapted to be saturated with a fluxing material and to engage a can body between them, means for periodically actuating a can body into the space between the pads, means for intermittently actuating said pads to engage the ends of the can body in order to transfer some of the flux to the end seams of the can, and means for regulating the pressure exerted upon the ends of the can by the pads.

10. A fluxing machine comprising spaced pads adapted to be saturated with a flux and to engage a can body between them, means for periodically actuating a can body into the space between the pads, and means adapted to operate in synchronism with the can body actuating means for compressing the pads against the end seams of the can to transfer some of the flux to said seams.

11. A flux applying machine comprising flux containing reservoirs, spaced pads adapted to be maintained in a saturated condition with flux from said reservoirs and to engage a can body between them, means for periodically actuating a can body into the space between the pads, and means for intermittently compressing said pads against the end seams of a can body in order to transfer some of the flux to the said seams.

HARRISON O. PRESTON.
FREDERICK J. STROWBRIDGE.